United States Patent [19]
Karlsson et al.

[11] Patent Number: 5,747,820
[45] Date of Patent: May 5, 1998

[54] INFRARED RADIATION SOURCE FOR A GAS ANALYZER AND METHOD FOR GENERATING INFRARED RADIATION

[75] Inventors: Kai Karlsson; Timo Meriläinen, both of Helsinki; Kurt Weckström, Espoo; Seppo Poikolainen, Vantaa, all of Finland

[73] Assignee: InstrumenTarium Corp., Finland

[21] Appl. No.: 499,177

[22] Filed: Jul. 7, 1995

[30] Foreign Application Priority Data

Jul. 11, 1994 [FI] Finland ............................. 943305

[51] Int. Cl.⁶ ........................................... G01J 3/10
[52] U.S. Cl. ............................. 250/504 R; 250/493.1
[58] Field of Search ......................... 250/504 R, 493.1

[56] References Cited

U.S. PATENT DOCUMENTS

| | | | |
|---|---|---|---|
| 4,499,382 | 2/1985 | Vincent | 250/493.1 |
| 4,673,031 | 6/1987 | Wiemer | 165/39 |
| 4,984,866 | 1/1991 | Boisgontier et al. | 350/96.2 |
| 5,059,397 | 10/1991 | Melly et al. | 422/94 |
| 5,118,947 | 6/1992 | Hamashima et al. | 250/352 |
| 5,291,022 | 3/1994 | Drake et al. | 250/504 R |
| 5,479,025 | 12/1995 | Huniu et al. | 250/504 R |

FOREIGN PATENT DOCUMENTS

| | | |
|---|---|---|
| 337724 | 10/1989 | European Pat. Off. |
| 417834 | 3/1991 | European Pat. Off. |
| 93/09412 | 5/1993 | WIPO |

*Primary Examiner*—Jack I. Berman
*Attorney, Agent, or Firm*—Andrus, Sceales, Starke & Sawall

[57] ABSTRACT

The invention relates to an infrared radiation source for a gas analyzer and a method for generating infrared radiation. The infrared radiation source comprises a body (6), thermal insulation material (5) adapted inside the body (6), a radiant element (1) fitted inside the insulation material (5), elements (2, 3) for feeding electric energy to said radiant element (1), and a channel (7) formed in said body (6) and said thermal insulation material (5) in order to pass the radiation generated by said radiant element (1) to the gas under measurement. According to the invention, at least the thermal insulation material (5) adapted in close proximity to the radiant element (1) has a low thermal conductivity and the emissivity of the radiant surface (11) adapted in close proximity to the radiant element (1) is greater than 0.5 at the operating temperature of the source.

16 Claims, 4 Drawing Sheets

INFRARED RADIATION SOURCE FOR A GAS ANALYZER AND METHOD FOR GENERATING INFRARED RADIATION

BACKGROUND OF THE INVENTION

The invention is related to an infrared radiation source for a gas analyzer.

The invention also concerns a method for generating infrared radiation.

Infrared radiation in gas analyzers is typically generated using a thermal radiation source, the surface of which is heated to such a sufficiently elevated temperature that the surface in accordance with Planck's radiation law and the spectral emissivity of the surface emits the required amount of radiant power at the measurement wavelengths employed in the gas analyzer.

The spectral emissivity of the radiating surface in the infrared source should be maximized for the wavelengths used in the analyzer. The area of the radiating surface and its temperature are selected according to the operating principle and optical construction of the analyzer. If the source must desirably have a very narrow-angle collimated beam, the radiant element shall have a small area and it must operate at a high temperature (cf. U.S. Pat. No. 4,499,382/Vincent, according to which an element diameter 1.57 mm and temperature 2000° K are used). If a collimated beam is not necessary, an emissive surface of larger area and lower operating temperature can be used.

Radiation sources can be complemented with optical systems such as mirrors or lenses employed to collect the radiation and direct it via the sample chamber of the gas analyzer to the detectors whose output signals are then processed by computational methods to determine the concentrations of the gases to be measured. This kind of arrangement has the shortcoming that the radiation source must be small and easy to align accurately. To achieve a sufficiently intense radiant flux, a high operating temperature must be used in the small and easy-to-align radiation source which is coupled to the radiation-collecting optical system. Such a high operating temperature limits the selection of materials suitable for use in the radiation source, and particularly, the life of the radiation source. Furthermore, the optical radiation-collecting system degrades the thermal insulation level of the radiation source.

The construction of the thermal radiation source can be, e.g., the Nernst glower, an incandescent filament wound onto a ceramic body, a silicon carbide glower or a glower spiral made from a suitable metal wire. Commercially available are also so-called black-body radiation sources principally intended for laboratory use and based on a cavity of special construction which is surrounded by an effective thermal insulation and kept very accurately at a constant temperature, whereby the cavity emits a spectral distribution accurately obeying Planck's radiation law, the effective spectral emissivity of the cavity being close to the theoretical maximum value (that is, 1.0). Cited U.S. Pat. No. 4,499,382 (Vincent) discloses an infrared radiation source which combines some benefits of the incandescent wire radiator and the laboratory-level Planck radiator. According to the cited patent document, the radiation source is formed by a cavity drilled in a ceramic rod which is heated by means of an incandescent wire placed on the outer surface of the rod.

A benefit of the incandescent-wire-heated cavity radiator disclosed in cited U.S. Pat. No. 4,499,382 is its high effective spectral emissivity, mechanical strength and a construction facilitating effective thermal insulation, whereby a good efficiency results. A disadvantage lies in that the radiant flux of the hottest part of the radiation source, namely the radiation emitted by the incandescent wire, cannot be utilized.

The Nernst glower is a bar or tube made of yttrium, thorium or ceramic material heated by electric current flowing through it. A disadvantage of the Nernst glower is that the electrical resistance of the glower at room temperature is so high that at start-up the glower must be heated by an external auxiliary heater to a value close to its operating temperature. Furthermore, the glower rod or tube has a low emissivity, typically varying in the range 0.15–0.75 over the wavelength range 3–20 μm.

While a resistive heater wire wound inside a ceramic body is capable of self-starting without heat applied from its exterior, its shortcoming is the same as that of the Nernst glower, namely the low spectral emissivity of the ceramic radiant surface.

A silicon carbide glower is frequently used as the radiation source in, e.g., infrared spectrometers. This type of glower comprises a silicon carbide bar having metallic electrode end caps conventionally made of silver. Electric current used for heating the glower passes through the silicon carbide body heating it up. A disadvantage of this radiation source is that water cooling is usually necessary to avoid overheating of the electrodes. Such cooling degrades the efficiency of the source and requires a complicated coolant circulation system.

A coiled incandescent filament element made from chromium-nickel alloy wire may also be used as a radiation source with an emissivity exceeding 0.9 over a wide wavelength range. The coiled incandescent filament typically needs to be supported by a ceramic body which conducts heat away from the radiator proper, thus lowering its spectral efficiency. This type of radiation source is disclosed in the publication WO 93/09412 (Herrera, Braig, Goldberger).

SUMMARY OF THE INVENTION

It is an object of the present invention to overcome the drawbacks of the above-described prior-art techniques and to achieve an entirely novel type of infrared radiation source for a gas analyzer and a method for generating infrared radiation.

The goal of the invention is accomplished by at least partially surrounding the radiation source by a thermal insulation material whose thermal conductivity is selected to be low, typically lower than 0.1 W/(m·K) and by making the emissivity of the background surrounding the radiation source high at the operating temperature, typically higher than 0.5. In an advantageous embodiment of the invention the radiation source proper is placed close to the thermal insulation material.

The invention offers significant benefits.

The gas analyzer radiation source according to the invention is suited for use without high-efficiency collimating optics, and owing to its good thermal insulation level and cavity construction, it achieves high spectral efficiency. An additional factor improving the spectral efficiency is that a significant portion of the radiation emitted by the radiant surface impinges on the radiant element thus increasing its temperature. As the radiation source according to the invention has a large radiant surface, the operating temperature of the source can be kept sufficiently low to achieve a very long life of the source. By virtue of the invention, the power consumption of the lamp may be reduced and simultaneously the spatial emission pattern of the lamp can be made insensitive to variations in the mechanical dimensions of the source. An additional benefit of essential importance offered by the present radiation source construction is that the mechanical alignment of the radiant element within the insulating material cavity has no significant effect on the radiant flux of the source. As the infrared radiation source according to the invention emits radiation from both the radiant element and the radiant surface surrounding it, the radiant flux of the infrared radiation source is not particularly sensitive to the location of the radiant element within the surrounding cavity. Consequently, the source construction according to the invention does not require accurate alignment of the radiant element. In the contrasting constructions of the prior art, focusing reflective surfaces are employed requiring minimum emissivity, typically less than 0.5. Due to the use of such focusing reflective surfaces, these embodiments require an accurate alignment of the radiant element at its correct place.

BRIEF DESCRIPTION OF THE DRAWINGS

In the following, the invention will be examined in more detail by means of exemplifying embodiments with reference to the attached drawings, in which.

DETAILED DESCRIPTION OF THE PREFERRED EMBODIMENT

Obviously, the infrared radiation source according to the invention may be classified into the category of radiation sources having a relatively large emitting area and a relatively low operating temperature as the source typically has an emitting area of approx. 10 mm$^2$ and an operating temperature of approx. 1200° K.

Figure 1:
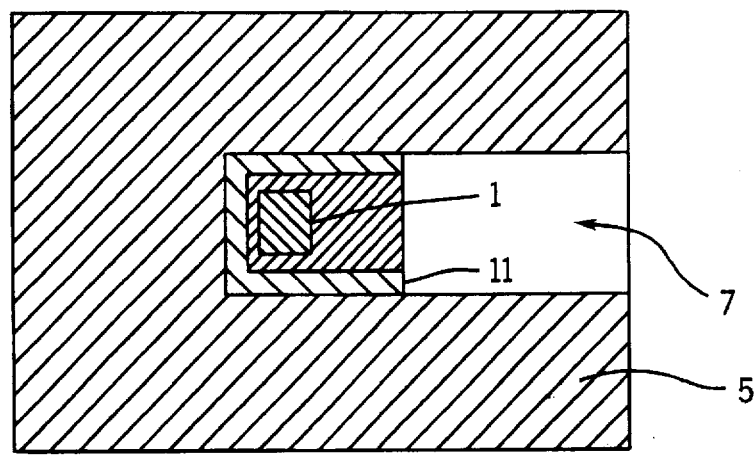
FIG. 1 is a longitudinally sectional side view of an infrared radiation source according to the invention.
Figure 2:
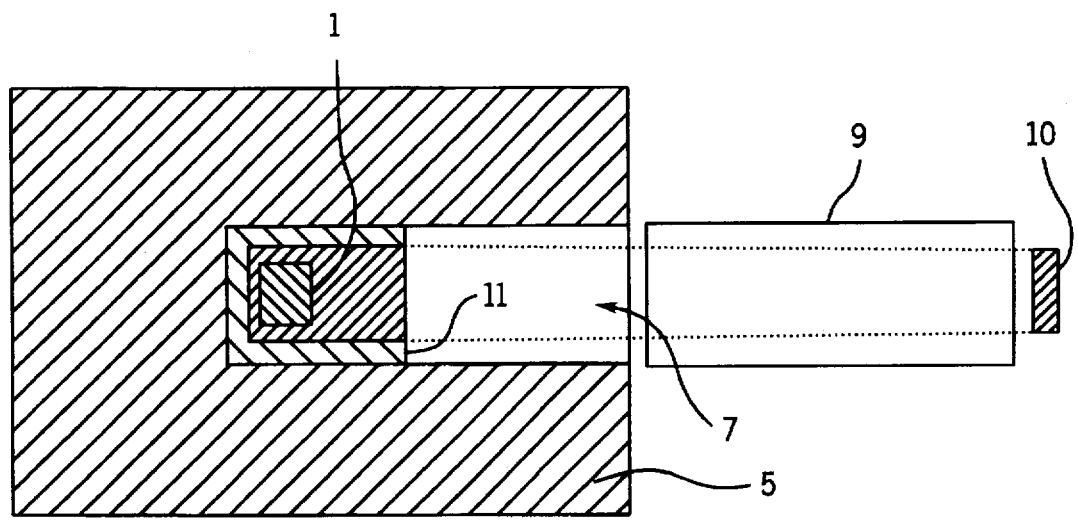
FIG. 2 is a longitudinally sectional side view of the infrared radiation source construction illustrated in FIG. 1 complemented with a measurement channel and a detector.
Figure 3:
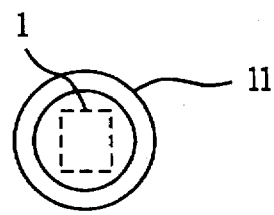
FIG. 3 is a front view of the aperture in the infrared radiation source constructions illustrated in FIGS. 1 and 2.

The radiation source according to the invention is diagrammatically illustrated in FIGS. 1–3.

Referring to the diagrams, the infrared radiation source comprises a radiant element 1, a radiant surface 11 at least partially surrounding the radiant element and a thermal insulation as well as a cavity 7 fabricated in the thermal insulation, whereby the opening of the cavity serves as an aperture for the emitted infrared radiation.

The radiant element 1 is heated by external energy passed thereto and functions as a source of infrared radiation whose characteristics are determined by the Planck radiation law. A portion of the radiation emitted by the element can reach the detector 10 of the analyzer via the aperture of the cavity 7 and the sample chamber 9.

A significant portion, or, preferably, most of the radiation emitted by the radiant element 1 is incident on the radiant surface 11. As the thermal insulation 5 permits only a minimal heat loss from the interior of the radiation source to the environment, the temperature of the radiant surface 11 is substantially elevated, whereby the surface starts to emit infrared radiation in accordance with Planck's radiation law, a portion of which can reach the gas analyzer via the aperture 7. To make the radiant surface act as an effective infrared radiator, its emissivity should be maximally high, preferably higher than 0.5.

FIG. 2 provides a diagrammatic illustration of also the sample chamber 9 and the infrared detector 10 of the gas analyzer, although these components are not directly associated with the infrared radiation source proper. Referring to FIG. 2, the part marked with dashed lines represents that portion of the infrared radiation source according to the invention which comprises the radiant element 1 and the radiant surface 11 and constitutes the radiation emitting portion of the infrared radiation source, the rays of infrared radiation being incident on the detector 10 from this portion. This geometry has a remarkable benefit in that the output flux of the radiation source is not particularly sensitive to the location of the coiled heater element 1. Hence, the alignment of the coiled heater element 1 is relatively noncritical.

Referring to FIG. 3, the infrared radiation source is shown as viewed from the detector.

In the embodiment according to the invention, the inner surface of the thermal insulation is adapted as close as possible to the outer surface of the coiled heater element in order to maximize the heat flow to the inner surface of the insulation. The distance between the coiled heater element 1 and the inner surface of the thermal insulation 5 is advantageously made as small as is feasible within the manufacturing tolerances. Alternatively, the coiled heater element 1 can be manufactured directly adhering to the inner surface of the insulation 5, whereby it will be mechanically supported. Furthermore, adapting the inner surface of the insulation 11 very close to the outer surface of the coiled heater element 1, or even in contact with the element, is advantageous as the thickness of the thermal insulation can thus be maximized within the constraints of the available space.

Figure 4:
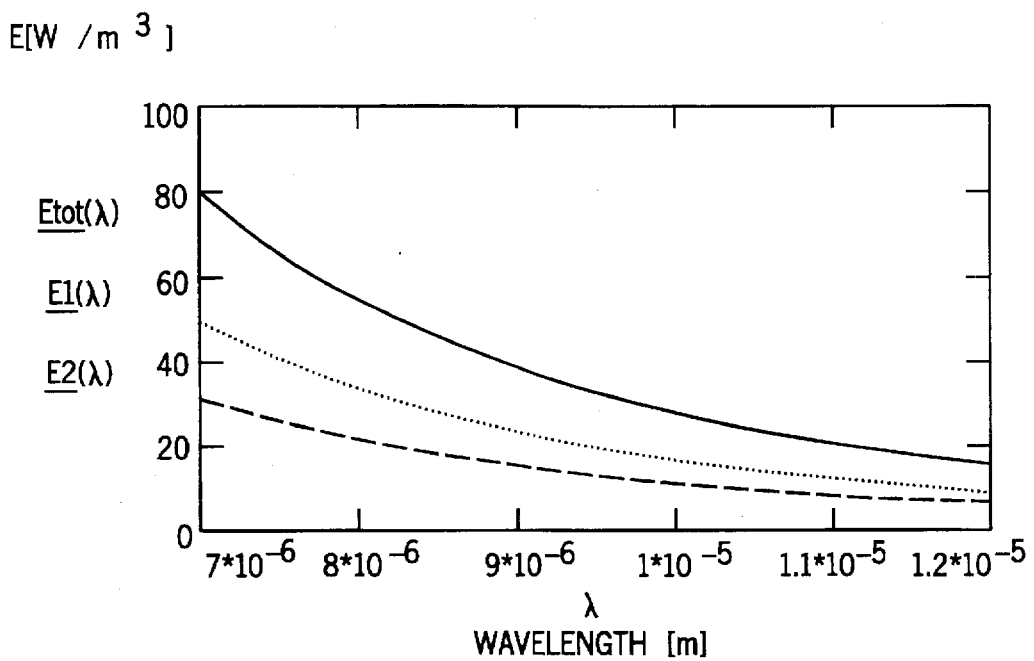
FIG. 4 is a graph elucidating the effect of the construction according to the invention on the amount of infrared radiation flux as a function of the wavelength.

Referring to FIG. 4, the dotted line in the graph represents the spectral distribution of the coiled heater element operating at 1100° K and the dash-dotted line represents the spectral distribution of the radiant surface operating at 900 K, while the continuous line shows the actual spectral distribution of the source over the wavelength range 7–12 µm, this spectral distribution being formed as the sum of the spectral distributions of the coiled heater element 1 and the radiant surface 11.

The curves plotted in FIG. 4 are based on the following calculations:

$h=6.6256 \cdot 10^{-34}$  $c=2.2979 \cdot 10^8$  $k=1.3805 \cdot 10^{-23}$ $C_1=8 \cdot \pi \cdot h \cdot c$  $C_1=4.992 \cdot 10^{-24}$ $C_2=h \cdot c/k$  $C_2=0.014$ Emission spectral distribution E1 of the coiled heater element 1:

$$E1(\lambda) = \frac{C_1}{\lambda^5} \cdot \frac{1}{\exp\left(\frac{C_2}{\lambda \cdot T1}\right) - 1} \cdot 0.9 \quad T1 = 1100\,K$$

Emission spectral distribution E2 of the thermal insulation:

$$E2(\lambda) = \frac{C_1}{\lambda^5} \cdot \frac{1}{\exp\left(\frac{C_2}{\lambda \cdot T2}\right) - 1} \cdot 0.9 \quad T2 = 900\,K$$

Total spectral distribution Eto is $Etot(\lambda) = E1(\lambda) + E2(\lambda)$

The calculations are carried out with the assumption that the emissivity of the coiled heater element 1 and the radiant surface 11 is 0.9 and that the areas of the radiant surface 11 and the coiled heater element 1 projected toward the detector 10 are equal. The diagram shows that at an 8.5 µm wavelength, for instance, approximately 40% of the output flux of the infrared source is emitted from the radiant surface 11.

Figure 5:
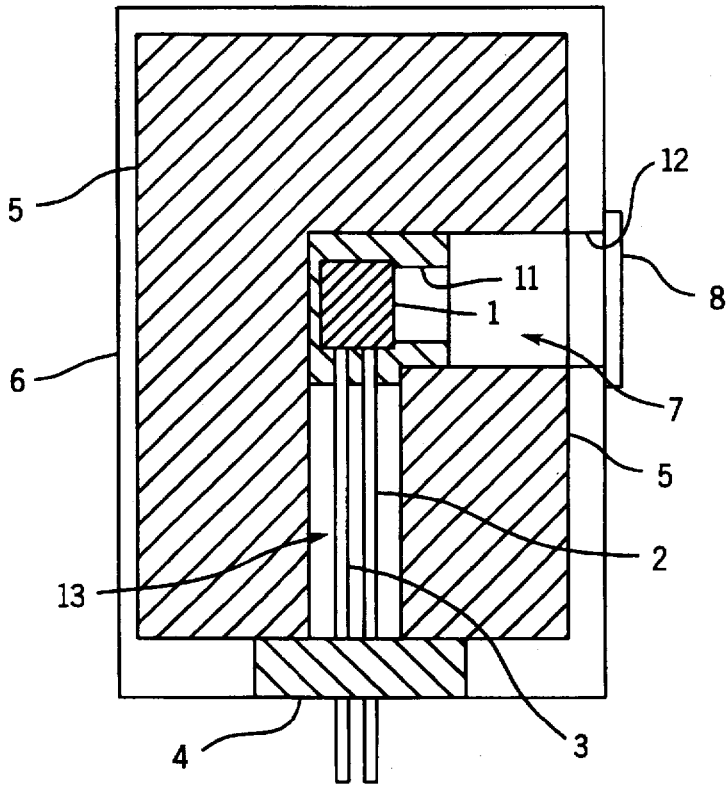
FIG. 5 is a side view of the infrared radiation source illustrated in FIG. 1 complemented with a body structure and a feed arrangement for the electrical heating current.

Referring to FIG. 5, the practical embodiment of the radiation source illustrated therein is comprised of an air-core coiled heater element 1, a radiant surface 11, electrodes 2 and 3 for passing electric current through the coiled heater element 1, a mounting collar 4, a thermal insulation 5, a body piece 6, a cavity 7 and a window 8 mounted on the body piece 6 at the aperture of the cavity 7.

In a preferred embodiment of the invention, the coiled heater element 1 acting as the radiant element may be made from, e.g., dia. 0.28 mm resistance wire type AF manufactured by Kanthal AB. The coiled heater element 1 may have a diameter of, e.g., 3.5 mm comprising 15 turns of the resistance wire.

The electric current is passed to the radiant element 1 by means of electrodes 2 and 3. The electrodes 2 and 3 may be of the same material as the coiled heater element 1 itself, or to minimize resistive losses, they may be made from, e.g., dia. 0.4 mm nickel wire, or to reduce both resistive and thermal conduction losses, they may alternatively be made from dia. 0.4–0.7 mm Kanthal AF wire. Further, it is possible to have one electrode, e.g., electrode 2 made from Kanthal AF wire while the other electrode 3 is made from nickel wire.

The mounting collar 4 may be a glass piece adhesive-bonded or fused to the electrodes 2 and 3, or alternatively, it may be an aluminium piece adhesive-bonded to the electrodes 2 and 3.

The thermal insulation 5 shall be made from a material whose thermal conductivity at the operating temperature of the coiled heater element 1 is the lowest possible. The emissivity of the radiant surface 11 over the operating wavelength band of the radiation source shall be as high as possible. In practice it has been found that the thermal insulation becomes disadvantageously thick if the thermal conductivity of the wall of the radiant surface 11 exceeds 0.1 W/(m·K) and that the radiation emitted by the inner surface of the thermal insulation has a minor role in the total spectral distribution if the emissivity of the surface is below 0.5. A suitable insulation material is, e.g., type WDS1000 manufactured by Wacker Chemie GmbH and specified to have a thermal conductivity of 0.05 W/(m·K) and an emissivity of approx. 0.9 at 900° C. When the coiled heater element 1 is surrounded from as many angles as possible by the above-mentioned insulation material, the coiled element can be heated to the required operating temperature (approx. 900° C.) using a relatively low electric input power. A cavity 7 and a feed-through hole 13 for the electrodes 2 and 3 are fabricated in the insulation material block 5 by drilling.

The radiant surface 11 may be formed by a layer of heat-resistant paint, e.g., type QF 180 manufactured by The Carborundum Company, Ltd., applied onto the inner surface of the thermal insulation block 5. The emissivity of such a coating is approx. 0.9 over the 8–9 µm wavelength band. On the basis of the graph plotted in FIG. 4 it can be said that the emissivity of the radiant surface must be greater than 0.5 to make the radiation emitted by the surface form a significant portion (more than 20%) of the total radiant flux of the infrared source.

The body piece 6 can be made from a metal, e.g., aluminium, whereby its cooling is easy to arrange. The body piece 6 is provided with an opening 12 with dimensions equal to the cross section of the cavity 7, whereby the emitted radiation can pass through the opening and the window 8 to the gas analyzer.

The window 8 is made from a material transparent to infrared radiation such as sapphire or calcium fluoride depending on the wavelength passband required in the gas analyzer. The window 8 may also be an optical filter optimized for the gas analyzer, whereby the filter passes only the desired wavelength band required in the gas analyzer and reflects infrared radiation at other wavelengths back to the cavity 7.

Figure 6:
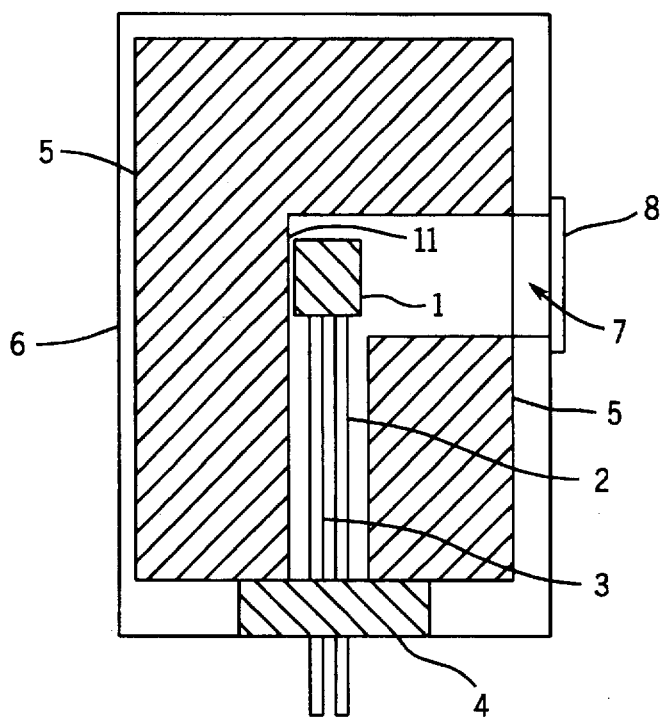
FIG. 6 is a longitudinally sectional side view of another embodiment of the infrared radiation source according to the invention.

Referring to FIG. 6, an embodiment is illustrated having the insulation material 5 (Wacker WDS1000) acting as both the radiant surface and the insulation material, whereby no separate radiant surface need be fabricated.

Figure 7:
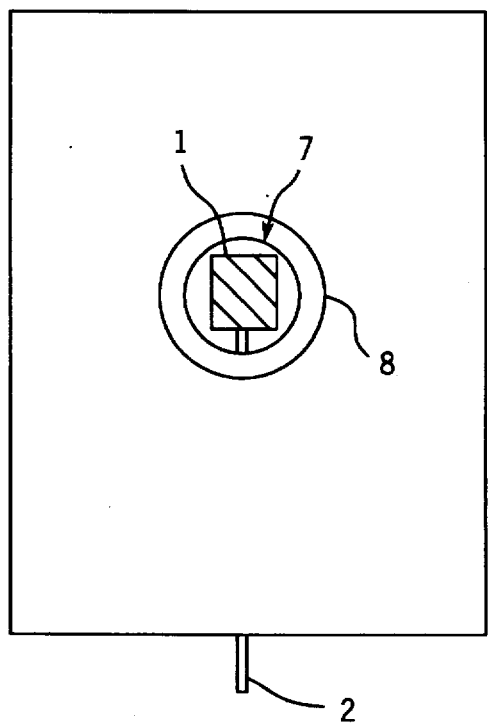
FIG. 7 is a front view of the infrared radiation source illustrated in FIG. 6.

Referring to FIG. 7, the construction of the radiation source shown in FIG. 6 is shown in a front view as seen from the gas analyzer side. In the radiation source according to the invention the infrared radiation can pass from both the coiled heater element 1 and the inner surface of the insulation material block 5 heated by the coiled heater element through the aperture 7 and the window 8 to the gas analyzer.

Figure 8:
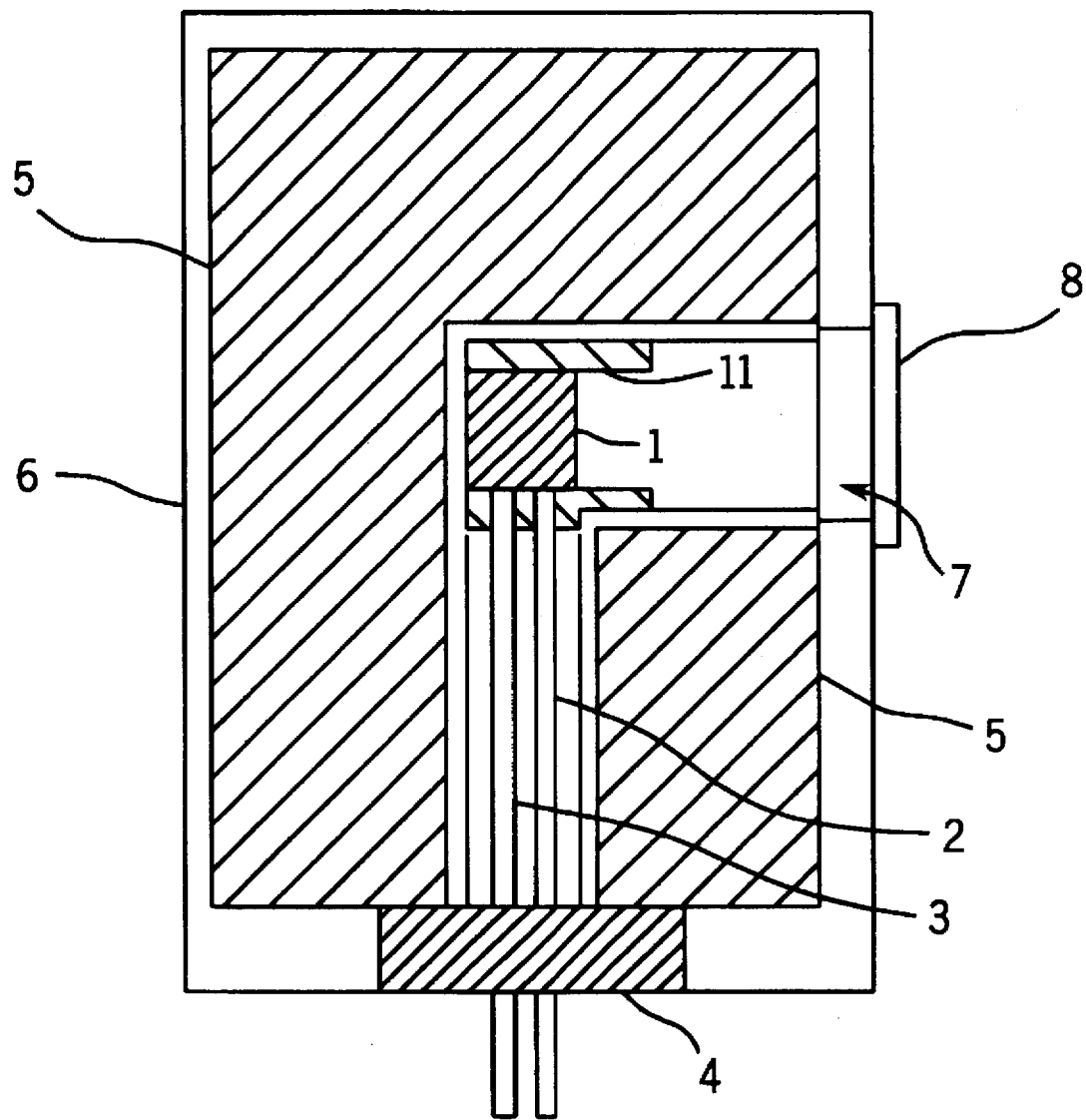
FIG. 8 is a longitudinally sectional side view of a third embodiment of the infrared radiation source according to the invention.

Referring to FIG. 8, an embodiment according to the invention is shown having the insulation material block 5 (Wacker WDS100) shaped by laser machining during which the insulation material 5 is heated very intensely at the machined point, whereby its top surface is burnt forming a mechanically durable and nondusting protective layer. As the emissivity of such a protective layer is low, the radiant surface 11 is formed by applying a coat of the heat-resistant paint type QF 180.

According to a preferred embodiment of the invention, the thermal resistance $R_{TH}$ of the insulation material 5 is advantageously greater than 200 K/W. In the context of this text the term thermal resistance is defined as the property $R_{TH} = L/(S \times A)$, where L = thickness of insulation
S = thermal conductivity, and
A = surface area of insulation.

The radiant surface 11 may also be an independent structure adapted between the radiant element 1 and the insulation 5.

According to the invention, the radiation emitted by the radiant surface 11 forms at least 20% of the total infrared radiant flux of the infrared radiation source. In a preferred embodiment of the invention, the proportion of the radiant surface 11 in the total radiant flux is greater than 40%.

We claim:

1. An infrared radiation source for a gas analyzer, the radiation provided by the source being passed through a gas to be analyzed to a detector (10), said source comprising:

a radiant element (1) emitting infrared radiation when heated by electrical energization thereof;

elements (2, 3) for passing electric energy to said radiant element (1);

thermal insulation material (5) partially enclosing said radiant element while providing a path for the infrared radiation from the element to the detector (10); and a radiant surface (11) positioned in close proximity to said radiant element (1) and within the partial enclosure of the radiant element provided by the thermal insulating material; said radiant surface being heated by the insulated radiant element (1) so that the radiation emitted by the radiant surface comprises at least 20% of the total infrared radiation output flux of the infrared radiation source.

2. A radiation source as defined in claim 1, characterized in that the emissivity of the radiant surface (11) is greater than 0.5 at the operating temperature of the source.

3. A radiation source as defined in claim 2, having the radiant element (1) formed by a coiled incandescent filament, and wherein the thermal conductivity of the thermal insulation material (5) at the operating temperature of the source is lower than 0.1 W/(m·K).

4. A radiation source as defined in claim 1, having the radiant element (1) formed by a coiled incandescent filament, and wherein the thermal conductivity of the thermal insulation material (5) at the operating temperature of the source is lower than 0.1 W/(m·K).

5. A radiation source as defined in claim 1, characterized in that the thermal conductivity of the thermal insulation material (5) at a temperature of 900° C. is maximally approx. 0.05 W/(m·K).

6. A radiation source as defined in claim 1, characterized in that the emissivity of the thermal insulation material (5) at the temperature of 900° C. is at least 0.9.

7. A radiation source as defined in claim 1, characterized in that the radiant element (1) is positioned in close proximity to inner surface of the thermal insulation material (5).

8. A radiation source as defined in claim 1, characterized in that the thermal insulation material (5) has a hard, thin, laser machined surface structure partially surrounding said radiant element.

9. A radiation source as defined in claim 1, characterized in that a discrete radiant surface (11) of high emissivity is formed between the thermal insulation material (5) and the radiant element (1).

10. A radiation source as defined in claim 1, characterized in that the thermal insulation material (5) functions as both thermal insulation and as the radiant surface.

11. A radiation source as defined in claim 1, characterized in that the thermal insulation material (5) and the radiant surface (11) are made from different materials.

12. A radiation source as defined in claim 1, characterized in that the radiant surface (11) heated by means of the radiant element (1) emits infrared radiation such that the contribution of the radiant surface in the total infrared radiation output flux of the infrared radiation source is at least 40%.

13. A method of generating infrared radiation comprising the steps of:

providing a radiant element (1) emitting infrared radiation when heated by electrical energization;

partially enclosing the radiant element (1) with a thermal insulation material (5) while providing an exit path for the infrared radiation, the thermal insulating material being contiguous to the radiant element (1) and having a low thermal conductivity in the vicinity of the radiant element (1) at the operating temperatures encountered in the generation of infrared radiation;

providing a radiant surface (11) in close proximity to the radiant element (1) and within the partial enclosure of the radiant element provided by the thermal insulation material, the emissivity of the radiant surface being greater than 0.5 at the operating temperatures encountered in the generation of infrared radiation; and energizing the radiant element with electrical energy to heat the insulated radiant element and the radiant surface and generate infrared radiation.

14. A method as defined in claim 13, characterized in that a discrete radiant surface (11) is formed between the thermal insulation material (5) and the radiant element (1).

15. A method as defined in claim 13, characterized in that radiation is generated principally over the wavelength range of 7–12 μm.

16. An infrared radiation source for a gas analyzer, the radiation provided by the source being passed through a gas to be analyzed, said source comprising:

a body of thermal insulation material (5);

a radiant element (1) positioned in the interior of said body of thermal insulation material (5) so that the thermal insulation material is contiguous to said radiant element, at least the portion of said body of thermal insulation material in close proximity to said radiant element having a low thermal conductivity at the operating temperature of the source, said radiant element emitting infrared radiation when heated by electrical energization thereof;

elements (2, 3) for feeding electric energy to said radiant element (1); and a channel (7) formed in said thermal insulation material (5) in order to pass the infrared radiation generated by said radiant element (1) to the gas under analysis; and a radiant surface (11) positioned in close proximity to the radiant element (1) and within the body of thermal insulation, said radiant surface being heated by the radiant element, the emissivity of the radiant surface (11) at the operating temperature of the source being greater than 0.5.

* * * * *